US012407566B1

(12) United States Patent
Kamichoff et al.

(10) Patent No.: US 12,407,566 B1
(45) Date of Patent: Sep. 2, 2025

(54) NETWORK RACK OF HOST SERVER COMPUTERS WITH INCREASED NETWORK AVAILABILITY

(71) Applicant: Amazon Technologies, Inc., Seattle, WA (US)

(72) Inventors: Mark Kamichoff, Ashburn, VA (US); Chinchu Merine Joseph, Cupertino, CA (US); Tahsin Erdogan, Kirkland, WA (US); Ke Zhang, San Jose, CA (US); James Paul Rivers, Capitola, CA (US); Shrawan Chittoor Surender, Pleasanton, CA (US); Shriram Srinivasan, Cupertino, CA (US); Colin Whittaker, Dublin (IE); Yuan Yuan, San Jose, CA (US); Abhishek Vinayak Naik, Campbell, CA (US); Leonid Livak, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/373,773

(22) Filed: Sep. 27, 2023

(51) Int. Cl.
*G06F 15/173* (2006.01)
*H04L 41/0686* (2022.01)
*H04L 47/125* (2022.01)

(52) U.S. Cl.
CPC ........ *H04L 41/0686* (2013.01); *H04L 47/125* (2013.01)

(58) Field of Classification Search
CPC .......................... H04L 41/0686; H04L 47/125
See application file for complete search history.

(56) References Cited

U.S. PATENT DOCUMENTS

| 10,708,198 | B1* | 7/2020 | Kommula | ............... H04L 49/15 |
| 2014/0140244 | A1* | 5/2014 | Kapadia | ............... H04L 61/103 370/255 |
| 2022/0086035 | A1* | 3/2022 | Devaraj | ............... H04L 43/065 |
| 2022/0337513 | A1* | 10/2022 | Gopalarathnam | .. H04L 43/0811 |
| 2023/0080702 | A1* | 3/2023 | Lu | ......................... H04L 45/566 709/238 |

* cited by examiner

*Primary Examiner* — Duyen M Doan
(74) *Attorney, Agent, or Firm* — Klarquist Sparkman, LLP (57) ABSTRACT

A host-to-ToR switch advertisement protocol can be used at a data center network edge to receive IP advertisements from hosts and convey ToR switch availability status (e.g., in service, intentionally out of service, or unintentionally out of service) back to hosts and vice versa. The host server computers can have the ability to advertise an arbitrary number of IPv4 or IPv6 prefixes to the network through the ToR switches. A single host server computer can leverage multiple instances across multiple ports to the same switch or different switches to implement load balancing (e.g., equal cost multipath (ECMP)) and fault tolerance. The host server computers benefit from an increased availability by receiving network traffic via multiple ToR switches, a single ToR switch with multiple links, or a combination of both.

18 Claims, 8 Drawing Sheets

NETWORK RACK OF HOST SERVER COMPUTERS WITH INCREASED NETWORK AVAILABILITY

BACKGROUND

Data centers are specialized facilities that form the backbone of modern computing services and are generally used for cloud computing. Cloud computing is the use of computing resources (hardware and software) which are available in a remote location and accessible over a network, such as the Internet. Data centers typically house server computers and other networking equipment in racks, which are metal structures that maintain the networking equipment in a compact and efficient manner. Each rack typically includes a Top-of-Rack (ToR) switch coupled to each server computer in the rack. Network traffic passes through the ToR to reach the server computers, and addressing of the server computers is dictated by the TOR's prefix.

A server that is only connected to a single TOR can be impacted if that TOR fails for any reason, and recovery requires moving workloads to a different server on another TOR or waiting for maintenance of the ToR. Better mechanisms are needed to ensure that server computers within a rack are available to network traffic despite a ToR failure.

DETAILED DESCRIPTION

A host-to-ToR switch advertisement protocol can be used at a data center network edge to receive Internet Protocol (IP) advertisements from hosts and convey ToR switch availability status (e.g., in service, intentionally out of service, or unintentionally out of service) back to hosts and vice versa. The host server computers can have the ability to advertise an arbitrary number of IPv4 or IPv6 prefixes to the network through the ToR switches. A single host server computer can leverage multiple instances across multiple ports to the same switch or different switches to implement load balancing (e.g., equal cost multipath (ECMP)) and fault tolerance. The host server computers benefit from an increased availability by receiving network traffic via multiple ToR switches, a single ToR switch with multiple links, or a combination of both.

Figure 1:
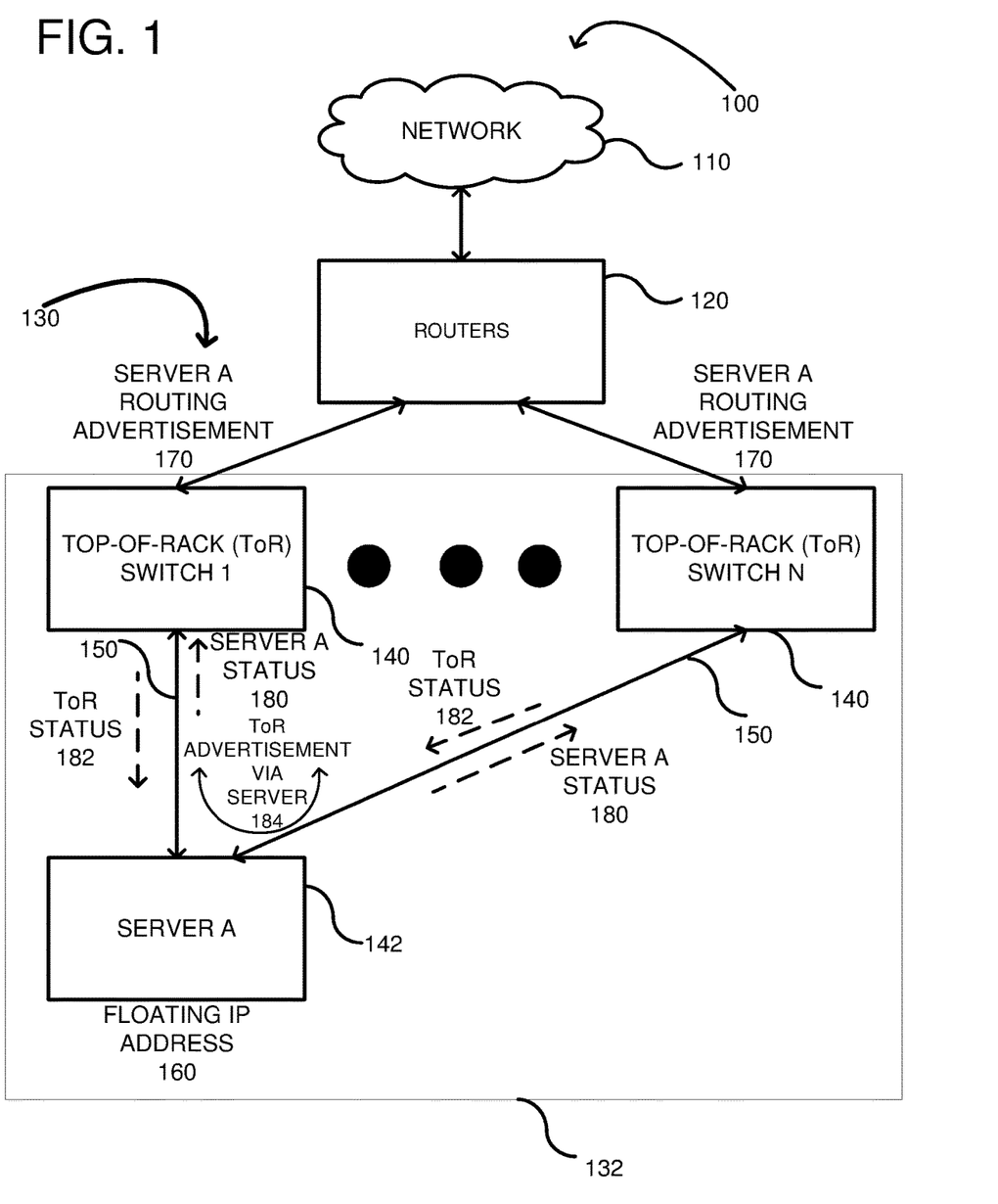
FIG. 1 is a system diagram of a network including multiple ToR switches coupled in parallel to a host server computer.

FIG. 1 is a system diagram of a network 100, wherein a portion of the network is shown generically at 110 coupled to network routers 120 near a network edge, shown generically at 130. The network edge 130 includes a rack 132 including various networking equipment, such as ToR switches 140 (1-N, where N is any positive integer number), and at least one host server computer 142. Additional host server computers are typically also included in the rack but are not shown for simplicity. The host server computer 142 is coupled via links (e.g., network cables) 150 in parallel to each of the ToR switches 140. Although only one link is shown per ToR-server computer connection, there can be additional links between each ToR and server computer (which is further described below in relation to FIG. 2). Traditionally, the server computer 142 in a rack 132 could not advertise to routers 120 coupled to the network 110. Additionally, traditionally, server computer 142 would have an IP address which is a subnet of the ToR switch. However, as shown at 160, the server computer 142 can have a floating IP address that is independent of the ToR switch, meaning that it is not a subnet of the ToR switch. Additionally, the ToR 140 can advertise (e.g., OSPF advertisement) 170 to neighbor routers 120 to indicate to the routers 120 that the server computer 142 is reachable via the ToR switches 140. Communications from the network 110 do still travel via the ToR switches to reach the host server computer 142. Although not shown, the server computer 142 can also transmit its floating IP address 160 to the ToR switches 140. The floating IP address 160 can be implemented in a variety of ways, such as binding the floating IP to a loopback interface. The host server computer can include multiple interfaces with one routing table per interface, wherein these routing tables forward inbound traffic from the physical interfaces destined for the floating IP address associated with the server computer. The floating IP's routing table can be used for ECMP outgoing host traffic towards the physical interfaces. The floating IP address 160 can be transmitted to the ToR 140 via a first protocol and the ToR can then use the floating IP address to build the advertisement 170 using a second protocol, which can be different from the first protocol.

The server computer 142 can transmit its operational status (e.g., in service, intentionally out of service, or unintentionally out of service) to each ToR, as shown at 180. Likewise, each of the ToR switches 140 can transmit its operational status to the host server computer 142, as shown at 182. The host server computer 142 can transmit network traffic via the ToR switches 140 to the network 110 and the host server computer 142 can use load balancing (e.g., ECMP) across the ToR switches. Adjustments to the load balancing can be made by the host server computer 142 in response to changes of the operational status of any of the ToR switches 140. The server computer 142 can also share an advertisement including peer information (e.g., IP address and interface) of one of the ToR switches with the other ToR switch, as shown at 184. More specifically, when the server computer 142 receives peer information from one ToR switch, it can re-transmit that peer information to the other ToR switches. In this way, the ToR switches do not require a direct connection therebetween. Advantages of the system 100 include that routers 120 now have network visibility into the host server computers, such as host server computer 142, in the rack 132. More specifically, a routing table entry in one or more of the routers 100 can be directed to the floating IP address 160, such as by using a prefix of the floating IP address. The routers 120 can route traffic to the server computer 142 through any of the ToRs 140 using ECMP. Likewise, the host server computer 142 can transmit network traffic using load balancing across the ToRs 140, such as by using ECMP. The ToRs 140 and server computer 142 share operational status and can make adjustments to traffic flow based upon the other's operational status. Still further, the ToRs 140 learn about the peer information of the other ToRs in the rack 132 via the server computer 142. Finally, any potential failure of one of the ToRs 140 can be rerouted around using standard routing protocols.

Figure 2:
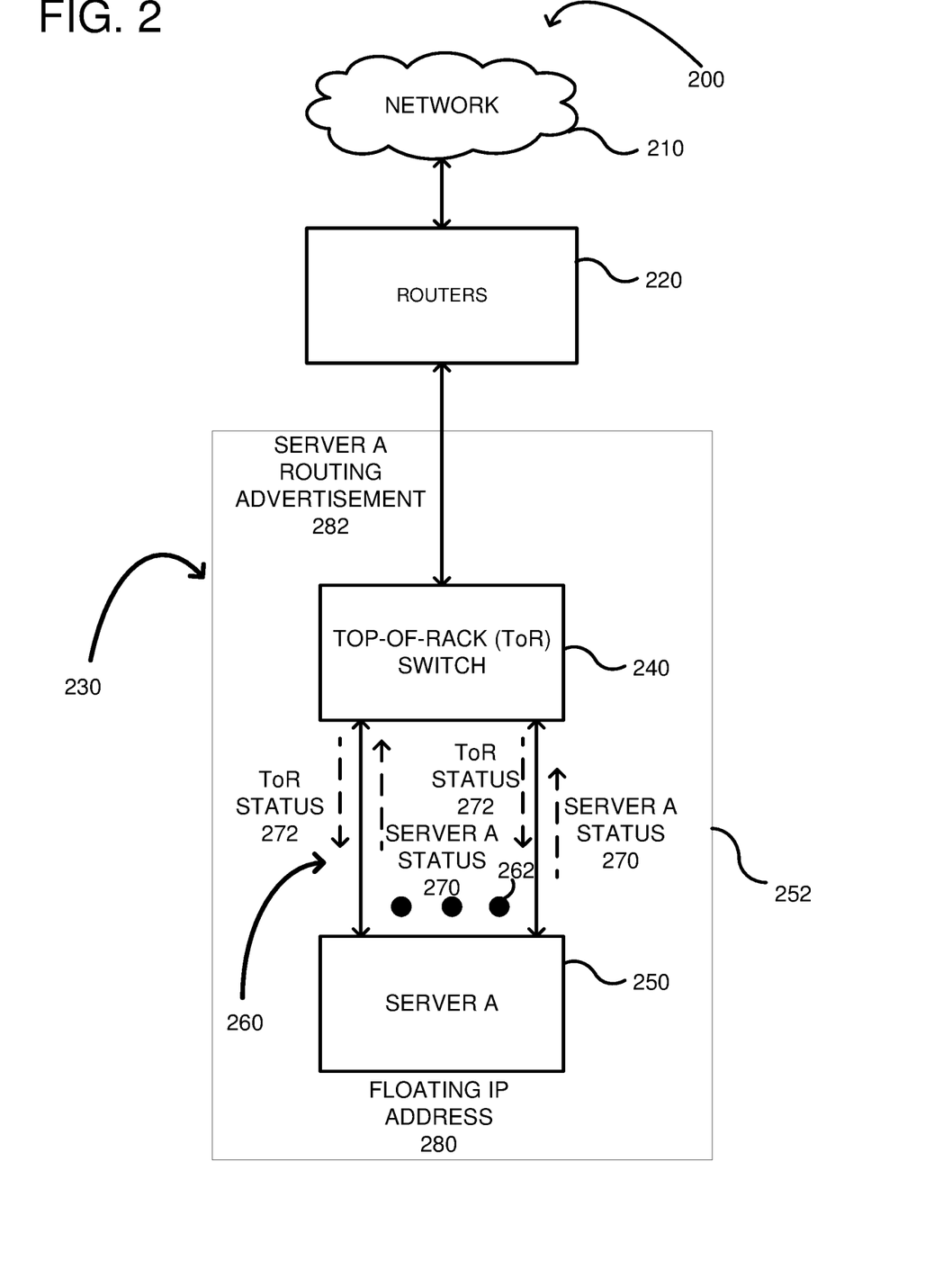
FIG. 2 is a system diagram of a network including a single ToR switch having multiple links coupled in parallel to a host server computer.

FIG. 2 is a system diagram of a network 200 according to another embodiment, wherein a portion of the network is shown generically at 210 coupled to network routers 220 near a network edge, shown generically at 230. A ToR switch 240 can be coupled to one or more server computers 250 in a physical rack 252. In this embodiment, the server computer 250 is coupled to the ToR switch 240 using multiple links 260 coupled in parallel. Any number of links can be used (as indicated by ellipses 262), such as M parallel links, where M is any positive integer number. Each of the links 260 can send separate operational status 270. Additionally, each link 260 can separately receive the operational status 272 of the ToR switch 240. The host server computer 250 can communicate with the network 210 over any of the links 260. Likewise, load balancing can be used for transmission over all of the links 260. The multiple links 260 allow any one of the links to fail and the host server computer 250 can maintain communications with the network 210. As indicated at 280, the server computer 250 can have a floating IP address as was described in FIG. 1. Additionally, the ToR switch 240 can advertise the host server computer's IP address as indicated at 282. A combination of FIGS. 1 and 2 (not shown) is also understood and includes multiple ToRs 240 coupled in parallel to the host server computer 250 and at least one the ToRs has multiple links 260 to the host server computer.

Figure 3:
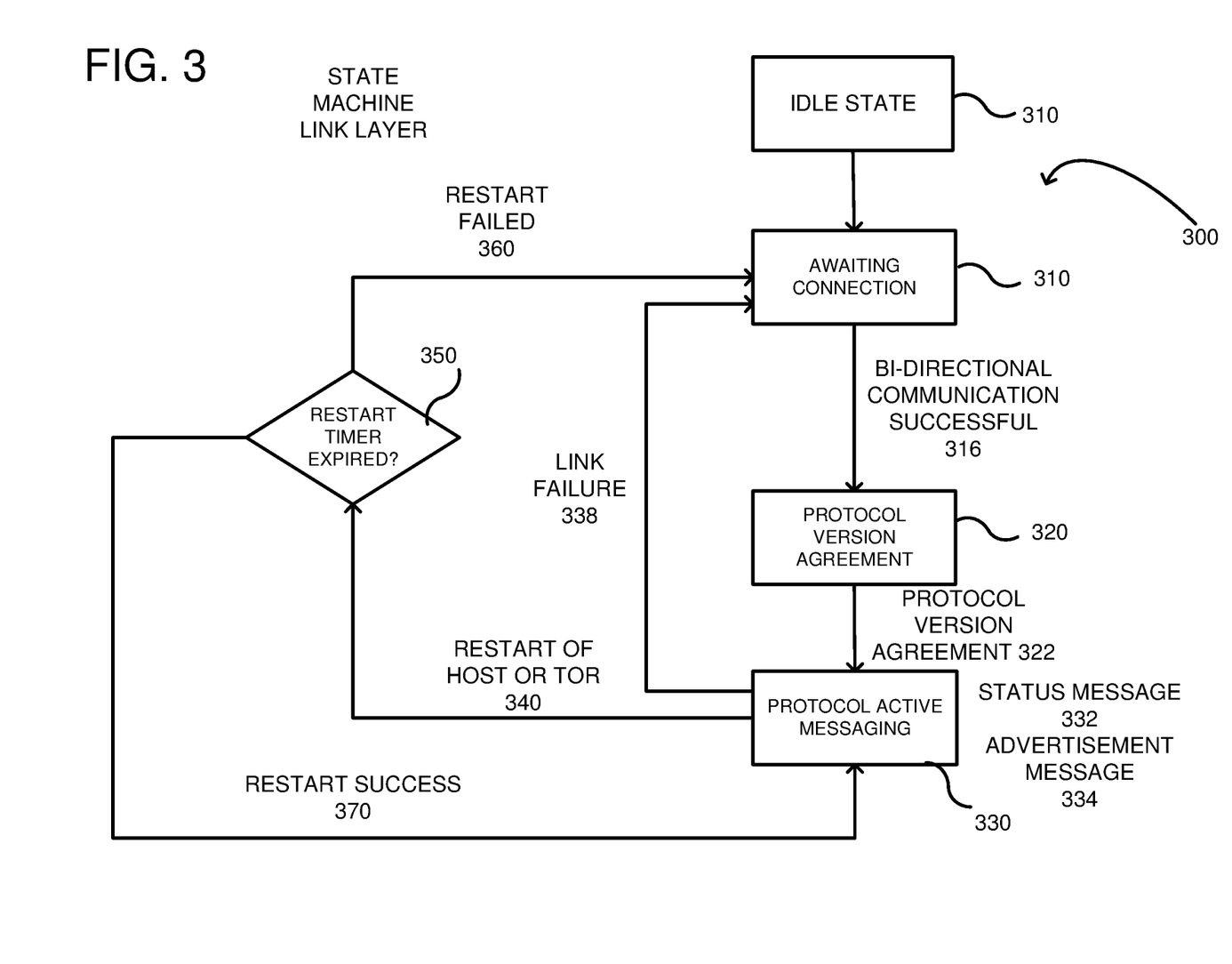
FIG. 3 is a diagram of a state machine that can execute on the host server computer and the ToR for communicating therebetween.

FIG. 3 is a state machine 300 that can execute on the host server computers 142, 250 and the ToRs 140, 240 of FIGS. 1 and 2 and represents link level transitions. The state machine 300 can be associated with a single port on the host server computer or the ToR and multiple of the state machines 300 can execute simultaneously, one per port. At 310, an idle state represents a continuous loop, wherein the state machine 300 detects that a port is free. In state 310, a connection is being made and the port has a cable plugged into it. Additionally, messages are being passed across the cable, but an agreed upon communication session has not been established. If a protocol is not agreed upon, then the state machine 300 continues to loop in this state. However, as shown at 316, if a protocol is detected that is agreed upon, then the state machine 300 advances to state 320, wherein the host server computer and the ToR communicate using the agreed-upon protocol to determine a version of the protocol that should be used. Once the version is agreed upon at 322, then the state machine advances to state 330 where active messages are transmitted using the protocol. One of the messages is the operational status 332. For example, the host server computer can describe to the ToR switch whether the host server computer is operating normally or if an error occurred. Another example is that the host server computer can transmit an advertisement message 334 that includes routing information, such as an IP address and/or an interface of the server computer. Other messages can include that a shift has been initiated, which means that the server computer and/or the ToR wants to move traffic off of this link and does not wish to receive traffic on this link. If a link failure occurs at 338, then the state machine returns to state 310 to reestablish a connection. If a restart (e.g., a graceful restart) of the host server computer or ToR occurs at 340, then the state machine transitions to state 350 where a timer is set and analyzed for whether the timer has expired. If the timer expires, then at 360, the state machine returns to state 310 awaiting a connection. On the other hand, if the restart is successful, then at 370, the state machine returns to the active messaging state 330.

Figure 4:
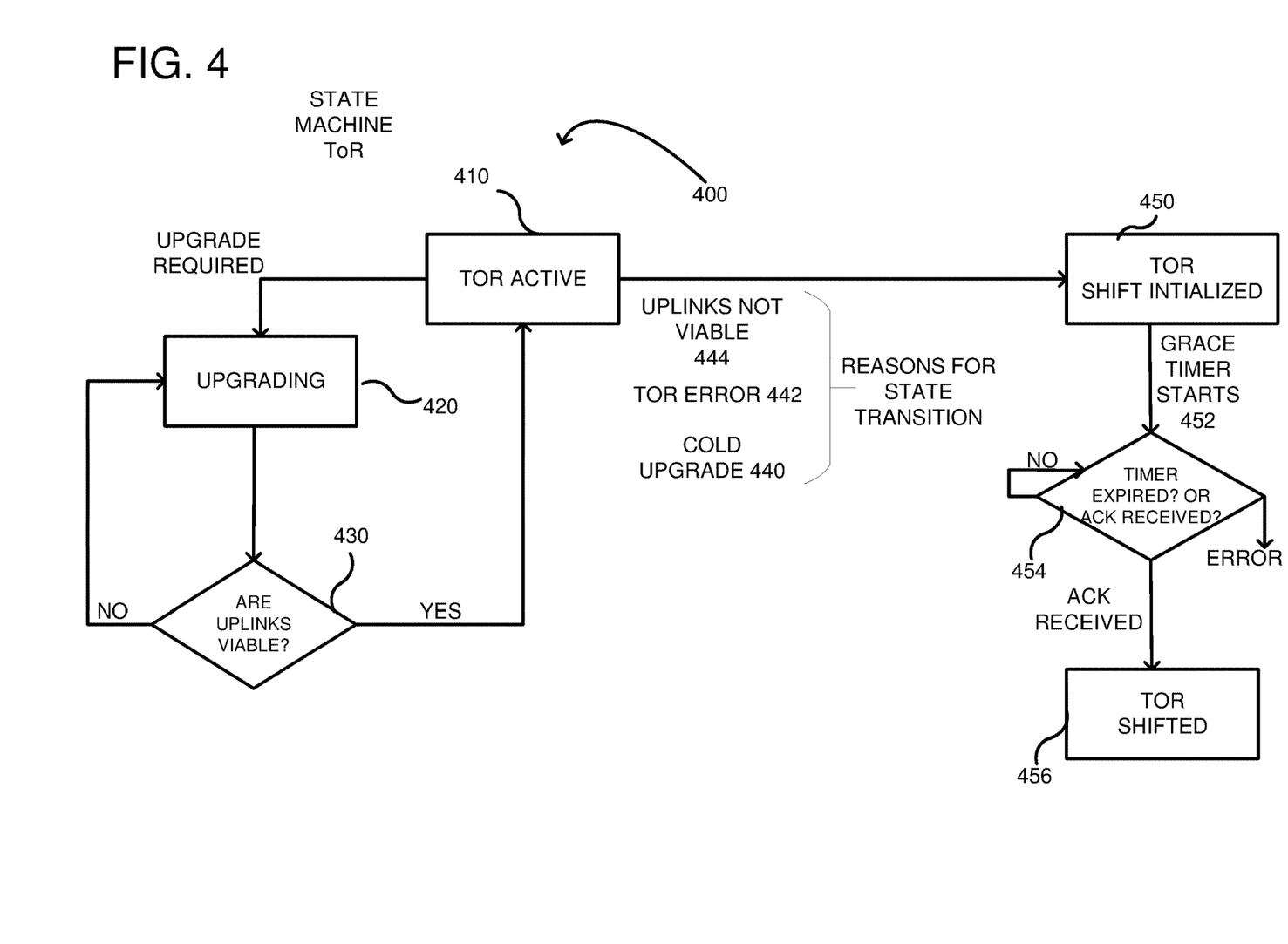
FIG. 4 is a diagram of a state machine that can execute on a ToR switch for communicating with the host server computer of FIG. 1 or 2.

FIG. 4 is a state machine that can be executed on the ToRs 140, 240 of FIGS. 1 and 2 at the device level. For the ToRs, the state machine of FIGS. 3 and 4 can execute simultaneously. The primary state is a ToR active state 410 wherein the ToR is actively passing traffic to the host server computer. If an upgrade is needed, then the state machine transitions to an upgrading state 420. In the upgrading state, the ToR signals to all hosts that an update has started and then a check is made whether all uplinks are viable at 430. Thus, upgrade status can be shared between the ToRs and host server computers. If the links are not yet viable, then the state machine continues the upgrading process at state 420. Otherwise, once the uplinks are viable, the state machine transitions again to the active state 410. From state 410, any of the events 440, 442, 444, can take the ToR out of its active state 410. Thus, if a cold upgrade 440 occurs or if a ToR error 442 occurs or if the uplinks are not viable 444, then the state machine transitions from state 410 to state 450. At state 450, a ToR shift is initialized to remove network traffic from the ToR. A grace timer 452 starts and a determination is made at 454 whether the timer expired or whether the shift was acknowledged. If acknowledged, then at state 456, the ToR shift is completed.

Figure 5:
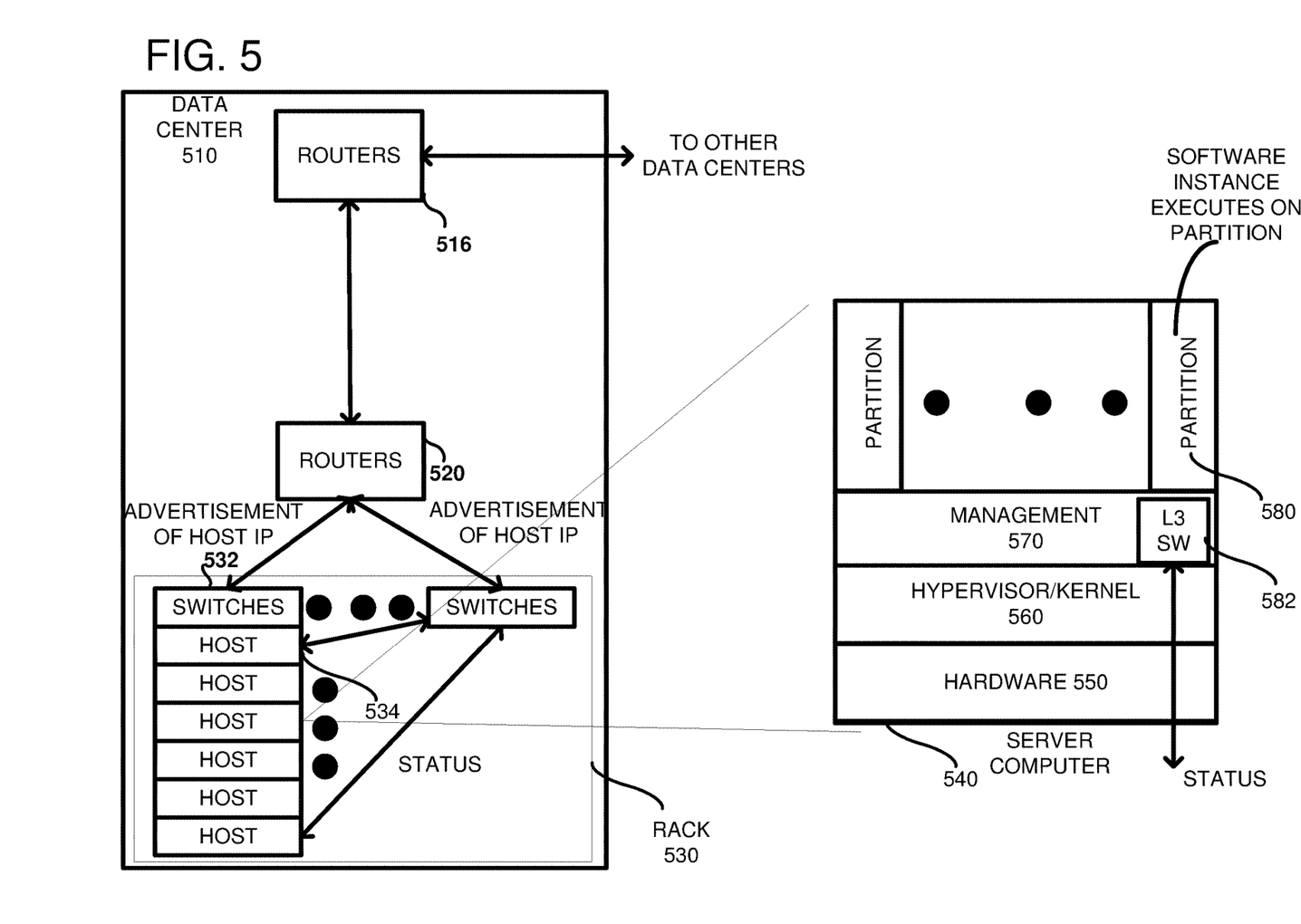
FIG. 5 is an example data center showing a rack of server computers coupled through multiple ToR switches to a network.

FIG. 5 illustrates physical hardware associated with a data center 510 in which the embodiments of FIGS. 1-4 can be used. Data center 510 is coupled to other data centers by routers 516. The routers 516 read address information in a received packet and determine the packet's destination. If the router decides that a different data center contains a host server computer, then the packet is forwarded to that data center. If the packet is addressed to a host in the data center 510, then it is passed to routers 520 that can route the packets to racks 530 including one or more switches 532 coupled to multiple host server computers 534. For example, a host 534 can be coupled in parallel to each switch 532 in the rack 530. A particular host server computer is shown in an expanded view at 540.

Each host 540 has underlying hardware 550 including one or more CPUs, memory, storage devices, etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The management layer 570 can also include layer 3 software 582 used to execute the state machines of FIGS. 3 and 4. Although shown at the management layer 570, the software 582 can be executed at other levels in the server computer 540, such as the hypervisor/kernel layer 560 or in the partitions 580. The partitions 580 are logical units of isolation by the hypervisor. Each partition 580 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

The data center 510 can be used in a compute service provider environment (i.e., a cloud provider environment), which is capable of delivery of computing and storage capacity as a service to a community of end recipients. In one example embodiment, the compute service provider can be established for an organization by or on behalf of the organization. That is, the compute service provider may offer a "private cloud environment." In another embodiment, the compute service provider can support a multi-tenant environment, wherein a plurality of customers operate independently (i.e., a public cloud environment). Generally speaking, the compute service provider can provide the following models: Infrastructure as a Service ("IaaS"), Platform as a Service ("PaaS"), and/or Software as a Service ("SaaS"). Other models can be provided. For the IaaS model, the compute service provider can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 400 using networked client devices, such as desktop computers, laptops, tablets, smartphones, etc. running web browsers or other lightweight client applications. Those skilled in the art will recognize that the compute service provider can be described as a "cloud" environment.

Figure 6:
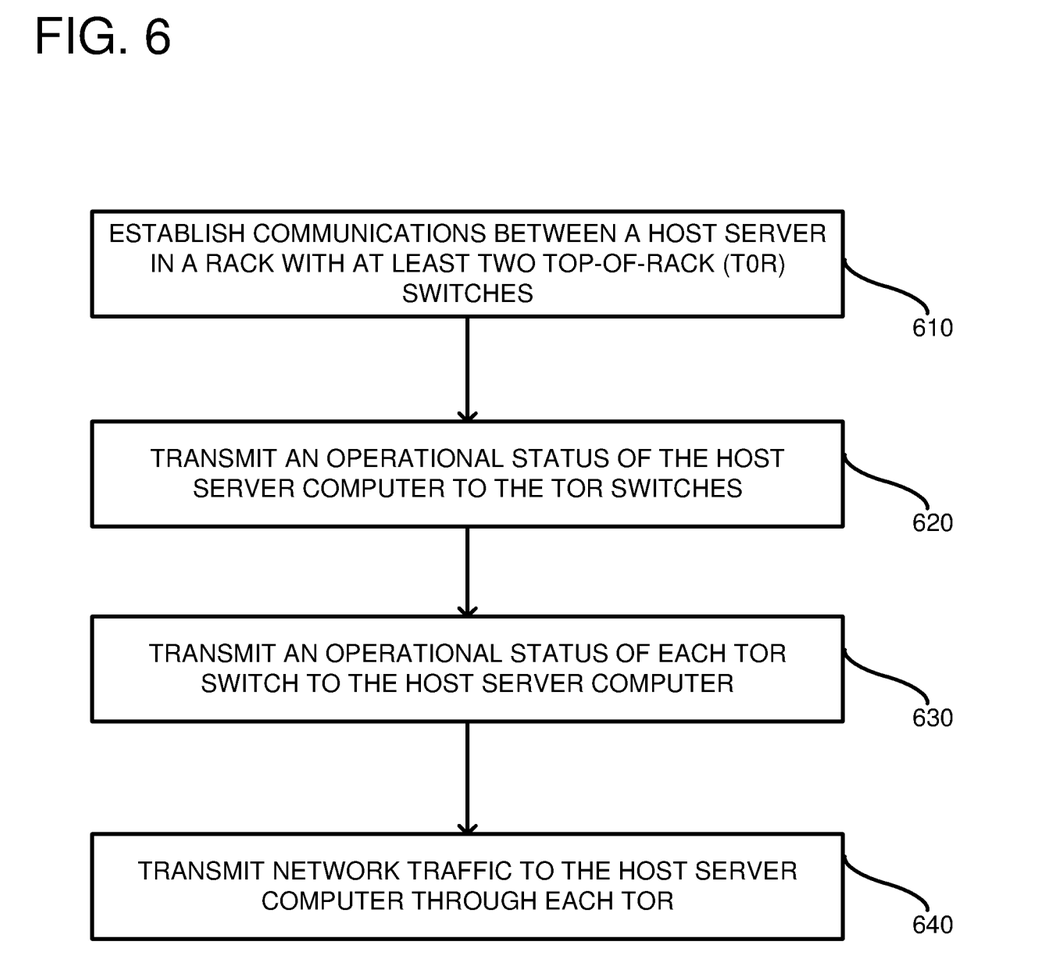
FIG. 6 is a flowchart according to one embodiment for transmitting an operational status between one or more ToR switches and the host server computer.

FIG. 6 is a flowchart according to one embodiment for increasing availability of host server computers at a network edge. In process block 610, communications are established between a host server computer in a rack with at least two ToR switches. For example, in FIG. 1, the host server computer 142 can establish communications with two or more ToR switches 140 (e.g., 3, 4, 5 ToRs, etc.) In process block 620, an operational status of the host server computer is transmitted to the ToR switches. For example, in FIG. 1, the status 180 can be transmitted from the host server 142 to the two or more ToR switches in parallel. In process block 630, an operational status of each ToR switch can also be transmitted to the host server computer. For example, in FIG. 1, the two or more ToR switches 140 transmit status 182 to the host server computer 142. In process block 640, network traffic is transmitted to the host server computer through each ToR switch. For example, in FIG. 1, routers 120 can implement ECMP across the ToR switches 140 to load share network traffic being delivered to the server computer 142 via the ToR switches.

Figure 7:
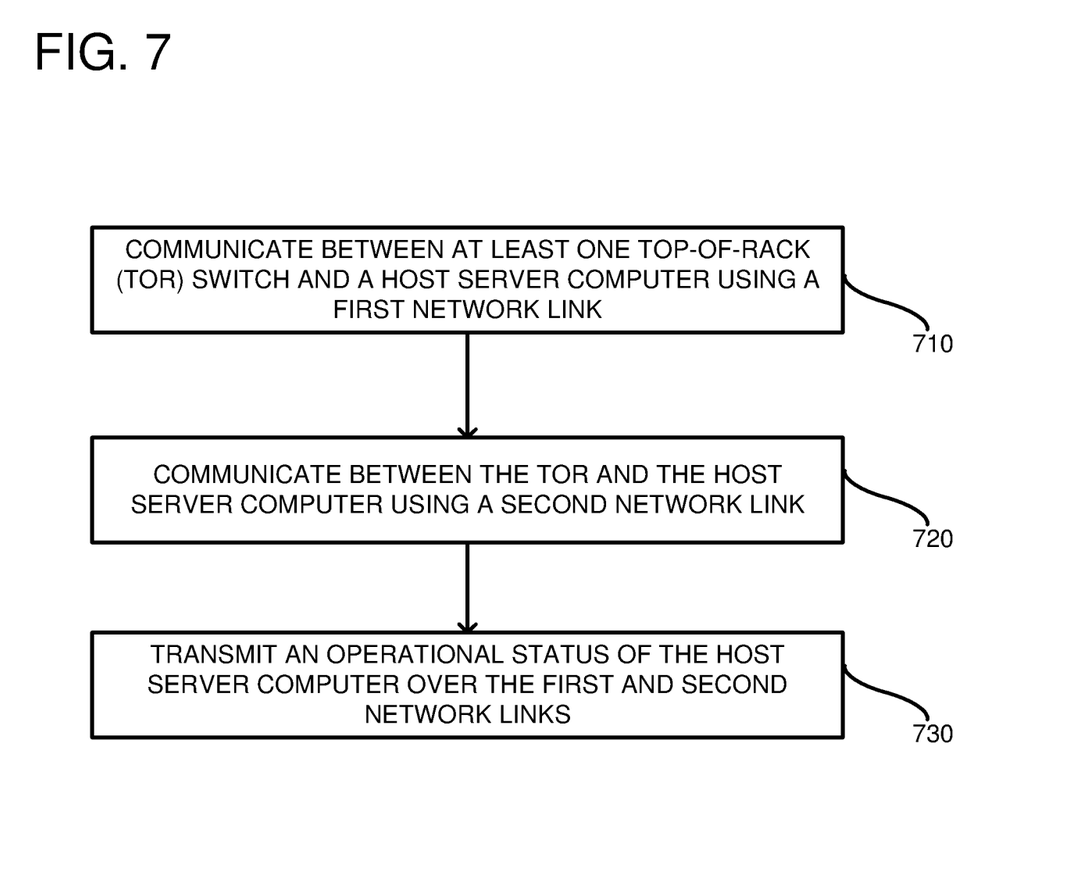
FIG. 7 is a flowchart according to another embodiment for transmitting an operational status between a ToR and the host server computer.

FIG. 7 is a flowchart according to another embodiment for increasing availability of host server computers at a network edge. In process block 710, at least one ToR switch and host server computer communicate using a first network link. For example, in FIG. 2, the host server computer 250 communicates with the ToR using one of the links 260. In process block 720, the ToR switch and the host server computer communicate using a second network link. For example, in FIG. 2, the host server computer 250 communicates with the ToR using one of the other links 260, which is a different link than in process block 710. Thus, the two communications from process blocks 710, 720 can occur simultaneously and in parallel. In process block 730, an operational status of the host server computer is transmitted over the first and second links. For example, in FIG. 2, the server status 270 is communicated to the ToR 240 over two separate links 260.

Figure 8:
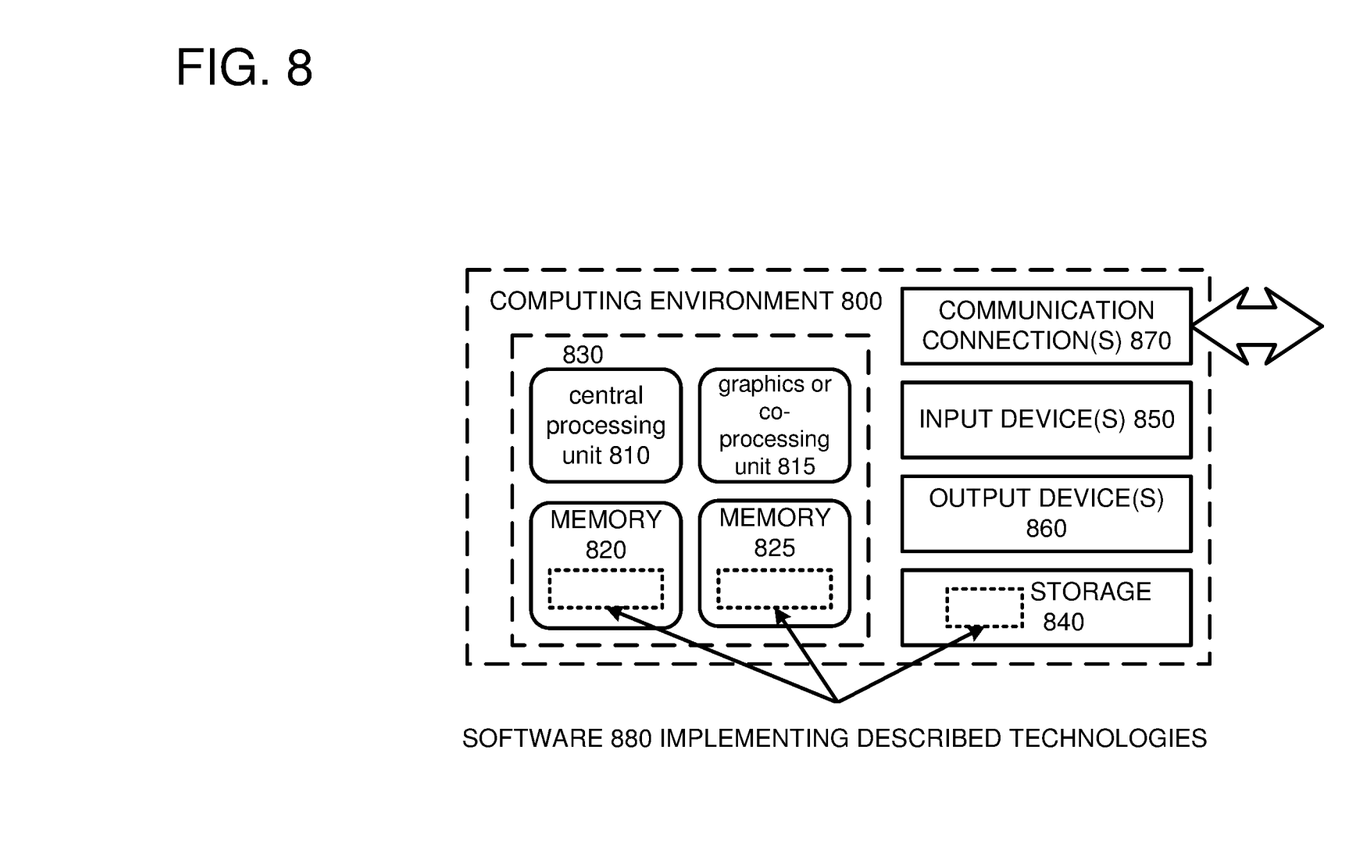
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the software 880 can execute the state machines of FIGS. 3 and 4.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of connecting a rack of host server computers to a network, the method comprising:
    establishing communications between a host server computer in the rack with at least two Top-of-Rack (ToR) switches coupled in parallel to the host server computer;
    transmitting an operational status of the host server computer from the host server computer to each of the ToR switches;
    transmitting an operational status of each of the ToR switches to the host server computer; and
    transmitting network traffic to the host server computer through each of the ToR switches;
    wherein the host server computer has a floating Internet Protocol (IP) address that is not a subnet of addresses of each of the ToR switches.

2. The method of claim 1, further including transmitting from each ToR switch, one or more network addresses associated with the host server computer to advertise to other network devices coupled to the network.

3. The method of claim 1, further including transmitting from the host server computer to one of the ToR switches, peer information of other ToR switches coupled to the host server computer.

4. The method of claim 1, wherein the host server computer performs load balancing by transmitting network traffic to each of the ToR switches coupled in parallel with the host server computer.

5. A method, comprising:
    communicating between at least one Top-of-Rack (ToR) switch and a host server computer using a first network link coupled between the host server computer and the at least one ToR switch;
    communicating with the at least one ToR switch and the host server computer using a second network link coupled between the host server computer and the at least one ToR switch; and
    transmitting an operational status of the host server computer to the at least one ToR switch over the first and second network links;

wherein the at least one ToR switch includes first and second ToR switches, and wherein the host server computer is coupled to the first ToR switch using the first network link and the host server computer is coupled to the second ToR switch using the second network link;

wherein the first ToR learns peering information of the second ToR via the host server computer.

6. The method of claim 5, wherein the at least one ToR switch includes only a first ToR switch in a rack with the host server computer and both the first network link and the second network link are coupled in parallel between the first ToR and the host server computer.

7. The method of claim 5, wherein the host server computer is within a physical rack and the at least one ToR switch is also within the physical rack and wherein the host server computer is coupled to a network only through the at least one ToR switch.

8. The method of claim 5, wherein the at least one ToR switch includes first and second ToR switches, wherein the host server computer receives an advertisement from the first ToR switch and transmits the advertisement to the second ToR switch.

9. The method of claim 5, wherein the at least one ToR includes 3 or more ToRs coupled in parallel with the host server computer.

10. The method of claim 5, wherein the host server computer has a floating Internet Protocol (IP) address that is independent of an address of the at least one ToR switch.

11. The method of claim 5, further including transmitting, from the host server computer to the at least one ToR switch, one or more network addresses to advertise to other network devices coupled to a network.

12. The method of claim 5, further including transmitting an operational status of the at least one ToR switch to the host server computer.

13. A system, comprising:
at least a first Top-of-Rack (ToR) switch coupled to a network;
a host server computer; and
two network links coupling the host server computer to at least the first ToR switch;
wherein the host server computer is configured to advertise an Internet Protocol (IP) address to the network via the ToR switch, wherein the IP address is a floating IP address that is not a subnet of the ToR switch.

14. The system of claim 13, wherein the IP address is a floating IP address that is not a subnet of the ToR switch.

15. The system of claim 13, wherein the at least the first ToR includes first and second ToRs with a first of the two network links coupled to the first ToR and a second of the two network links coupled to the second ToR.

16. The system of claim 13, wherein the at least the first ToR includes first and second ToRs coupled to the host server computer by the two network links, respectively, and the system further including a third ToR coupled to the host server computer with a third network link coupled in parallel with the two network links.

17. The system of claim 13, wherein the host server computer is configured to communicate operational status to the at least first ToR via both of the two network links.

18. The system of claim 13, wherein the at least first ToR is configured to communicate an operational status to the host server computer.

* * * * *